Dec. 22, 1964   J. M. LAWSON   3,162,292
LUMBER HANDLING APPARATUS
Filed March 7, 1962   3 Sheets-Sheet 1

United States Patent Office 3,162,292
Patented Dec. 22, 1964

3,162,292
LUMBER HANDLING APPARATUS
Joseph M. Lawson, 4334 Woodcrest Drive,
Memphis, Tenn.
Filed Mar. 7, 1962, Ser. No. 178,067
7 Claims. (Cl. 198—33)

This invention relates to machines for handling boards of lumber or other elongated articles, and more particularly, to machines for sorting and unscrambling a randomly-arranged pile of lumber and dispensing the boards out one at a time positioned in the same orientation.

There has long existed a need in industries, such as building materials, etc., which handle and utilize cut lumber in large quantities, as well as in lumber mills and yards, for a device capable of receiving a jumbled pile of boards having random orientations, re-arranging them into the same positional orientation, and feeding them out individually for stacking or for a variety of production machining operations, such as cutting, or the like. Without such a machine, these operations on the cut lumber have to be performed manually with attendant large expenditures in time and cost, not to mention the safety hazard involved. One possible approach to this problem would be the development of a machine capable of handling individually each and every board taken from the pile, regardless of its orientation, and re-arranging that board into the desired position. Such a machine, by the very nature of its operations, would necessarily be an extremely complex and expensive mechanism since there are an infinite number of possible orientations of boards taken from a randomly-arranged pile of lumber.

The present invention is, by comparison, of uncomplicated, economical design and achieves the desired objectives in a novel manner. In operation, the machine utilizes the principle that, in any sizeable group of boards having random orientations, there are always a number of boards within the group which will have orientations falling in a selected range of deviations from a given predetermined orientation.

A machine constructed in accordance with the teachings of the invention is designed to sort out and select from a jumbled pile of lumber received at its input only those boards having orientations which lie within a small range of deviations from the desired position. The boards so selected by this sorting or unscrambling process are then each squared up to have the desired orientation and individually passed to the output of the machine where they may be stacked or fed into a subsequent machine performing further operations on the lumber. The remainder of the boards in the lumber pile having orientations lying outside the selected range are rejected in the unsorting operation and are returned to the input of the machine. Since the boards of this rejected group arrive back at the input in random arrangement and are further jumbled with the mass of lumber already there, some boards of the rejected group now assume orientations lying within the predetermined range. Thus, on their second pass at the sorting operation, certain boards of the group rejected in the first pass will now be selected and, after being squared off to have the desired orientation, will be carried through to the output of the machine. The feeding, sorting and rejecting processes occur continuously in a repetitive manner during the operation of the machine; thus all of the boards in the original pile eventually pass through to the output of the machine arranged in the same desired position, since all of the boards at one stage or another of randomness will assume an orientation lying within the predetermined range of deviations from the desired position and thus will be selected by the sorting operation of the machine.

In an illustrative embodiment of the invention described in detail hereinafter, boards of cut lumber from a jumbled mass are fed onto a conveyor, comprised of a plurality of chains, which travels upwardly in a steep incline. The boards are supported and carried on the conveyor chains by sets of horizontally-aligned lug members which project outwardly from the surface of the conveyor. The conveyor travels in a path which, at its topmost portion, describes a circular arc around an inner diameter of a vertically-disposed circle. This circle is described by the path of travel of a plurality of rotating cylindrical drums of identical size which are secured to a corresponding set of sprocket gears for the conveyor chains and keyed together to form a common elongated drum driven by a single horizontal shaft. The number of these drums may be varied in accordance with the needs of the user depending upon the nominal length of the boards which the machine is to be adapted to handle.

The bases of each of the cylindrical drums are comprised of a pair of spaced wheels of generally circular configuration having a circumference greater than the circular arc of the conveyor. Each wheel face is secured to, and carried by, a chain sprocket gear which serves to drive the traveling conveyor and which in turn is itself driven by rotation of the common drum shaft. Incorporated into the outside periphery of each of the wheels are a plurality of spaced, tooth-like projections for transporting from the conveyor, at the point where the conveyor's line of travel is intercepted by the circumference of the drum, certain selected lumber boards carried upwardly by the conveyor. In some embodiments of the invention, a series of horizontal rollers, arranged in sets following each individual wheel tooth, are disposed about the outside periphery and extend between each of the wheel pairs in an individual drum.

At the point where the boards carried by the upwardly-inclined conveyor intersect the outside circumference of the coaxially-mounted drums, a set of horizontally-aligned teeth on the periphery of the respective drums engage and retain certain of the boards carried by the lugs on the conveyor chains. The boards so selected are those whose longitudinal axes lie substantially perpendicular to the plane of the vertically-disposed circular path traveled by the rotating drums (i.e., parallel to the common axis of rotation for the drums). The remainder of the boards, whose axes lie outside the range of deviations from the preferred orientation or which are not in contact with the lugs of the conveyor chain slide off the rotating drums as they are carried in an ascending arc from the interception point and fall back onto the bottom of the conveyor. The rollers on the outer periphery of the respective drums are free-turning and thus assist this gravitational selection process as they provide a near friction-free surface for the sliding action.

As the drums rotate, the selected boards are squared up along their respective length by the effects of gravity which forces the boards against the set of horizontally-aligned tooth supports such that, by the time that a given board reaches the topmost point on the drum arc and then begins traveling down a descending path, its longitudinal axis lines up parallel to the preferred orientation. At a point somewhat below the top of the drum arc on the descending portion thereof, a vertically-inclined slide or chute is juxtapositioned. The boards, which are now aligned, are then carried off from the drum at this point by their own momentum and slide down the chute, still retaining the desired orientation. The boards arriving individually at the bottom of the chute may then be stacked or fed into subsequent apparatus performing further operations thereon.

The operation of the machine is such that, in addition to rejecting in the sorting process those lumber boards whose axes are not aligned substantially horizontally and perpendicular to the direction of travel, those boards which tend to be carried on the top, or by the forward edge, of other boards, as they are advanced by the lug members on the conveyor, are likewise rejected at the conveyor-drum transfer point. This ensures that the sorted boards appearing at the out-feed of the machine are dispensed one at a time.

One particular lumber-handling machine which has been constructed according to the present invention has the capability of sorting out, at capacity, 60–75 boards per minute of up to 24 feet in length from a scrambled pile of lumber supplied to the in-feed of the machine, and dispensing them one at a time with the same axial orientation.

It is therefore an objective of the present invention to provide novel means for sorting and unscrambling a randomly-arranged pile of lumber boards or similar elongated articles and dispensing the boards out individually and aligned with the same axial orientation.

It is a further objective of the present invention to provide novel lumber-handling apparatus for performing a selective operation on a jumbled pile of lumber received at the input of the apparatus, wherein only those boards assuming axial orientations lying within a small range of deviations from a predetermined position are carried through to the output of the apparatus.

It is a still further objective of the present invention to provide apparatus for handling lumber or like articles contained in a randomly-arranged pile wherein certain of the lumber boards, not initially possessing axial orientations within a predetermined range, are repeatedly rejected and cast back onto the pile in the course of a selection process performed by the apparatus, until they eventually assume orientations within the given range.

Another objective of the present invention is to provide a lumber-handling apparatus of economical and uncomplicated design for sorting and unscrambling a pile of lumber and dispensing the boards out one at a time positioned in the same axial orientation.

The foregoing and other objects, features, and advantages of the present invention will be more readily understood upon consideration of the following detailed description of an exemplary embodiment thereof, taken in conjunction with the accompanying drawings.

FIG. 4 is a schematic diagram illustrating certain geometrical relationships existing between components of the embodiment shown in FIG. 1.

Figure 1:
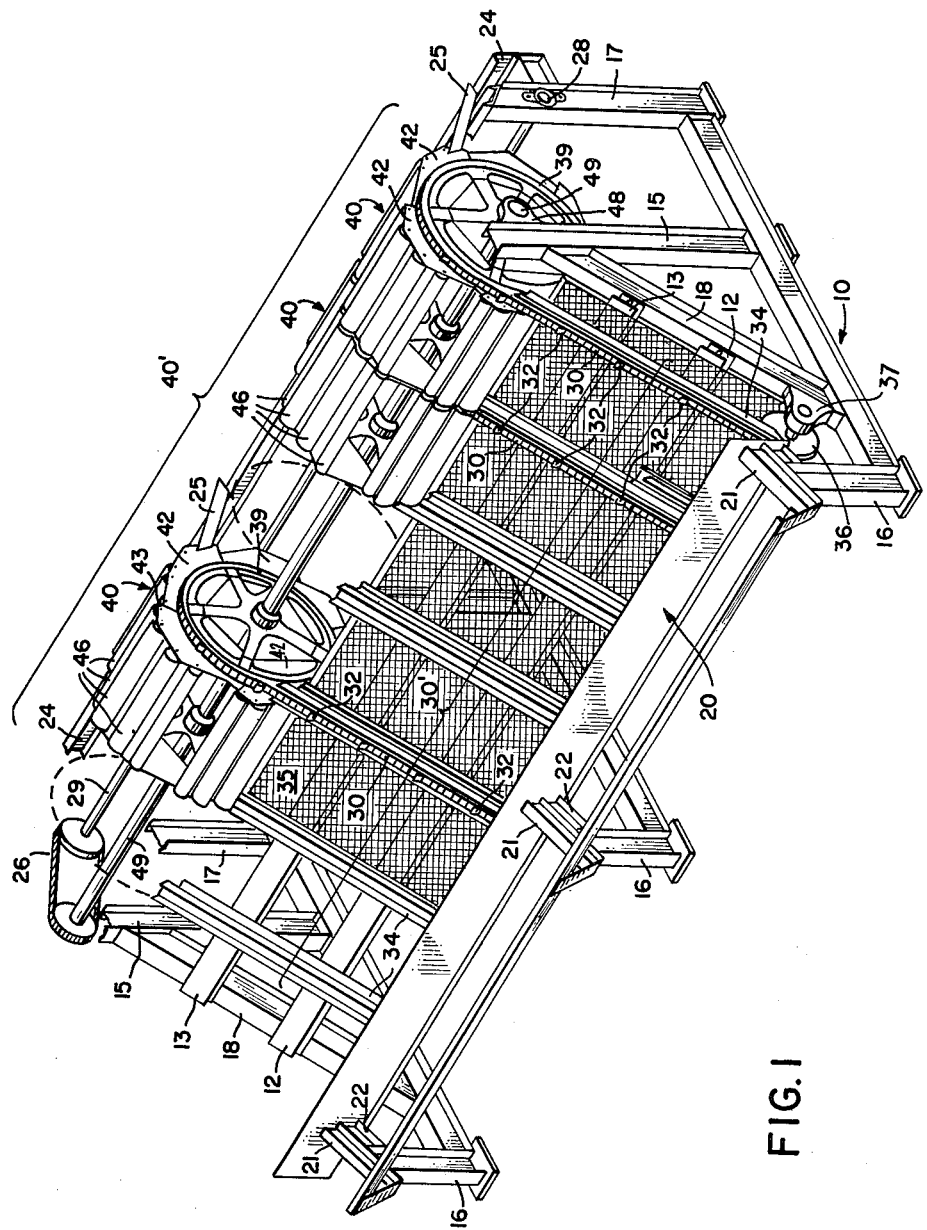
FIG. 1 is a partially-fragmentary, perspective view of an embodiment of the present invention, some of the individual drum assemblies and conveyor chains being omitted from the figure for purposes of clarity.
Figure 2:
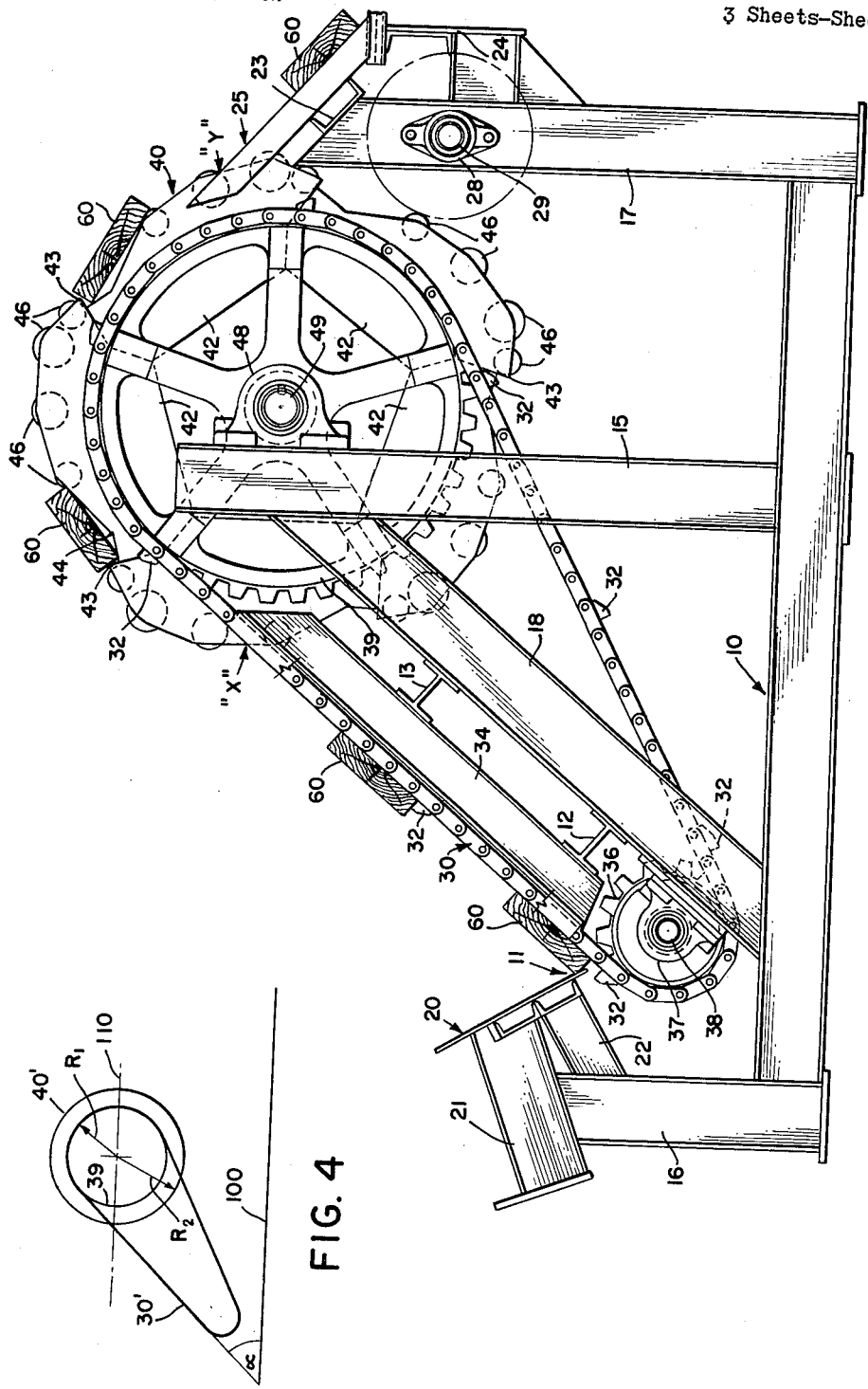
FIG. 2 is a side elevational view of the embodiment of the invention shown in FIG. 1.

Referring now to FIGS. 1 and 2 of the drawings, there is shown therein an exemplary embodiment of an apparatus constructed according to the teachings of the present invention. A frame assembly 10 provides a sturdy base for supporting component parts of the apparatus. The major elements of the combination comprise, (1) an in-feed guide 20, (2) an upwardly-inclined conveyor 30' formed of a plurality of chains 30, (3) a plurality of drums 40 of generally cylindrical configuration, rigidly connected together by a series of sprocket gears keyed to a common shaft to form a composite elongated drum 40', and (4) an out-feed guide 25. A detailed description of the construction of each of these elements, in left-to-right order according to the direction of flow of lumber material through the machine, will now be given.

The first of these components, the in-feed guide 20, is in the form of a downwardly-inclined plane, affixed by brackets 21 and 22 to spaced upright support 16 rigidly secured to the frame assembly 10. The in-feed guide 20, together with the upwardly-inclined conveyor 30 (more fully described hereinafter), form a trough 11 for holding a jumbled pile of lumber boards 60 which are supplied with randomly-arranged orientations to the in-feed of the machine by manual or mechanical means (not shown). Many of the lumber boards received at the in-feed of the apparatus in an initially scrambled orientation become squared up, by the force of gravity, as they slide about in the steeply-inclined trough 11, such that their elongated axes become generally aligned in a horizontal direction perpendicular to the line of travel of the conveyor 30'. (This direction line will hereinafter be referred to as "the preferred direction.")

A conveyor 30', comprised of a number of individual chains 30, is next provided for transporting the lumber boards 60 from the bottom of the trough 11 up an incline for transfer to the elongated drum 40' in a manner which will be described subsequently. The drum 40' is shown as being comprised of a linked set of six smaller drums 40, mounted between conveyor chain sprockets 39 which are keyed to a common shaft 49. The shaft 49 has its axis of rotation aligned in the preferred direction and is rotatably supported at either end within a bearing assembly 48 carried on uprights 15 which are rigidly secured to the frame assembly 10. The base or outside wheel face of each drum 40 is in the form of a plurality of sectored segments 42 secured to a conveyor sprocket gear 39. As the sprockets 39 are all keyed to the common shaft 49, they serve to drive the individual conveyor chains 30 and the respective drums 40 in a synchronized manner. An important feature of this invention, which will be more fully explained in connection with the description pertaining to FIG. 4, is that the sprockets 39 are arranged about a circle, which defines the upward arc portion of the conveyor's path and which is of lesser diameter than the diameter of the drum's periphery.

As shown, a second and smaller set of sprocket gears 36 are provided at the lower ends of the individual conveyor chains 30. These sprocket gears are carried on a common shaft 38, having an associated bearing assembly 37 at either end thereof, and mounted on respective cross-brace members 18 which are rigidly connected to the upright supports 15 and the frame assembly 10. Associated with each roller chain 30 of the conveyor 30' is a race 34, supported from cross-brace members 18 by a parallel pair of horizontal beams 12 and 13, which provides a guide channel for the chain during the upward portion of its travel. A screen mesh 35 is provided along the conveyor incline for preventing lumber boards from falling through or wedging into the frame assembly 10.

Spaced along each chain 30 are a plurality of projecting lugs 32 which serve to successively engage lumber boards 60 at the bottom of the trough 11 and advance them up the incline of the conveyor 30'. In the particular embodiment of the invention herein described, the projecting lugs 32 are shown as having a height of about half the thickness of the lumber boards 60. In other good embodiments of the invention, these lugs may project to a greater height to ensure a more secure engagement with the sides of the boards and thereby lessen the likelihood that the shifting mass of the piled lumber, and the scrambled arrangement of the boards therein, will prevent some of the lugs on the upwardly advancing chain from securely holding onto the boards as they emerge from the trough.

The lugs 32 are disposed in spaced relationship along the length of the respective chains 30 such that each is aligned horizontally in a set with its neighbors on the other chains, as shown in FIG. 1. This arrangement of the respective lugs 32 in horizontally-aligned sets causes many of the traveling lumber boards 60 carried by the conveyor 30' to assume orientations lying in the preferred direction as they slide back against the lugs due to the force of gravity.

As the composite drum 40′ is rotated, the lumber boards 60, engaged at their trailing edge by lugs 32, are advanced upwardly along the conveyor's incline until intersection of its path of travel with the cylindrical surface of the rotating drum. At this intersection point, designated as "X" in FIG. 2, those boards whose longitudinal axes have been squared up by the lugs 32 to lie in the preferred direction are removed from the conveyor 30′ by an intercepting set of wheel teeth 43 and successfully transferred to the periphery of the composite drums 40′; those boards which have not assumed the preferred orientation and are not in contact with lugs 32 are rejected (that is, they are not transferred over to the drum) and are cast back down the conveyor incline to the trough 11 at the bottom. The manner in which this selection-rejection process is performed will be more fully described later in connection with the discussion pertaining to FIG. 3.

Each of the drums 40 is divided into a plurality of equal sectors 42 (five being shown in the present embodiment), each of which in turn is comprised of a projecting tooth element 43, an adjacent pocket region 44, and a following series of freely-turning rollers 46. These rollers 46 are interposed horizontally in sets between the sectored wheel faces of the individual drum cylinders 40.

The composite drum 40′ is rotated by a suitable motor means (not shown) which supplies a rotary movement to the drum shaft 49 through a chain drive comprising belt 26 and drive shaft 29, the latter being restrained at either end within a bearing assembly 28 and supported from the frame assembly 10 by spaced upright members 17.

At the point designated "Y," a plurality of downwardly-inclined members, disposed along the length of the composite drum 40′, in the spaces between the individual drums 40, intersect the descending arc portion of the drum's periphery to form an out-feed guide or chute 25. These out-feed guide members 25 are supported by brackets 23 and 24 which extend horizontally from spaced uprights 17. The vertically-inclined out-feed guide 25 is arranged such that lumber boards 60 carried on the periphery of the composite drum 40′ are caused to leave the drum, by the force of their own momentum, at the interchange point "Y" and slide down the guide. The boards thus arriving at the bottom of the guide may then be stacked individually or fed to subsequent work tool stations, such as planers, saws, etc., performing further operations thereon.

As is more fully explained in connection with the discussion pertaining to FIG. 3, those lumber boards 60, which are successfully transferred to the pockets 44 on the periphery of the composite drum 40′ at the conveyor-drum interchange point "X," assume, or have assumed, axial orientations lying in the preferred direction before the circular path of travel followed by the drum begins the downward arc portion of its journey. Accordingly, the aligned boards may be removed from the drum by locating the interchange point "Y" of the drum with the out-feed at a suitable position beyond the zenith of the drum arc on the descending side thereof.

In some embodiments of the invention it may be desirable to have the out-feed comprise a second conveyor belt, instead of a gravity-fed chute, for removing the now properly-aligned boards 60 from the composite drum 40′ on the descending arc portion of its travel path. In such cases, it is possible for the out-feed conveyor to travel an upward incline and have the aligned boards transferred from the drum follow along an elevated path.

Figure 3:
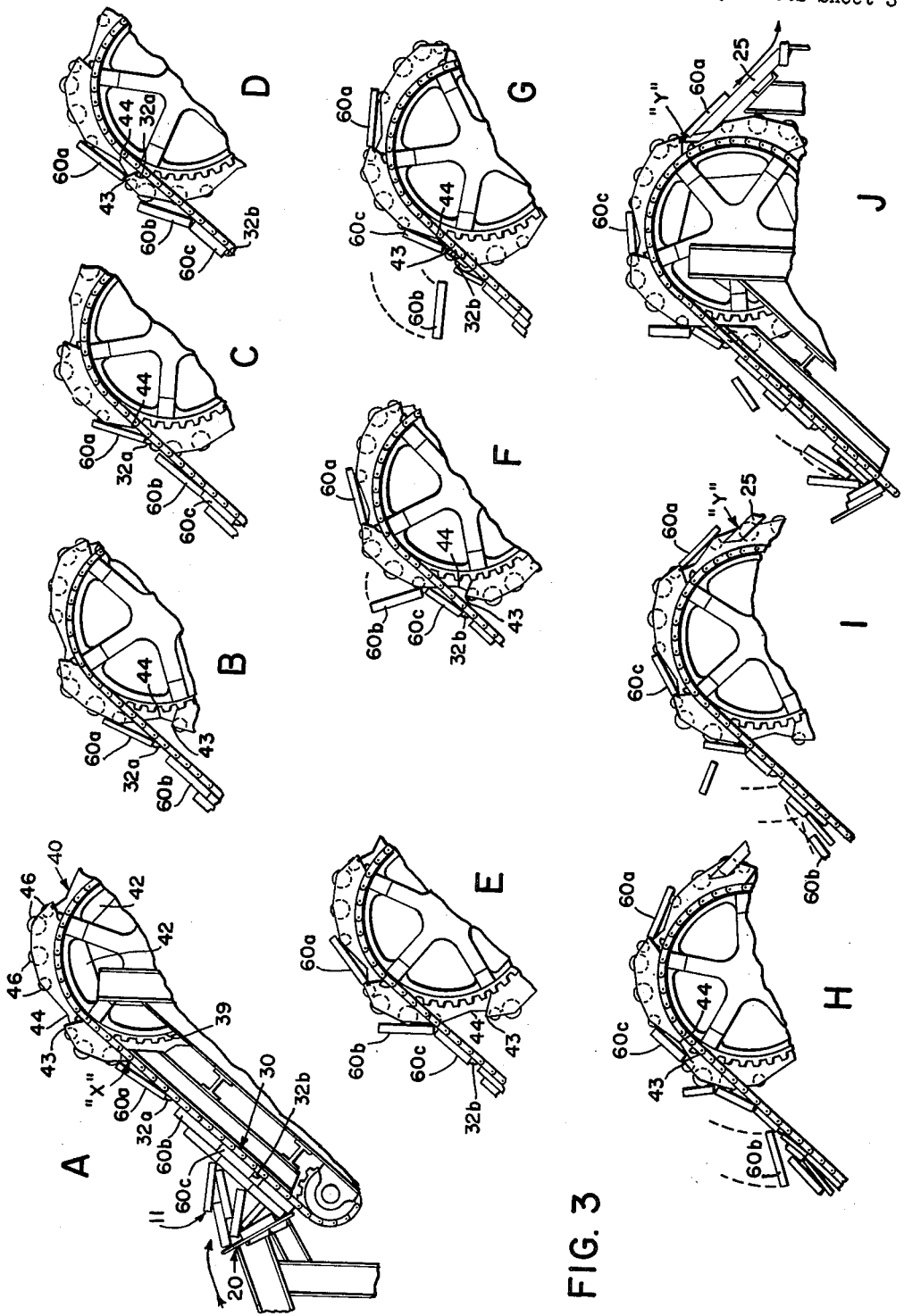
FIGS. 3A–3J is a series of progressive views of the embodiment of FIG. 1 in operation, illustrating the sorting, selection, and dispensing action of the apparatus.

FIG. 3 shows a sequence of 10 views illustrating the operation of the machine. The side elevation views A–J show the successive position of typical lumber boards, 60a, 60b, 60c, taken from the scrambled pile of lumber contained in the trough 11, as the conveyor chains 30 advance in increments of two pitches. As the operational sequence illustrates, lumber board 60a is advanced by a spaced set of horizontally-aligned lugs 32a on the conveyor up an inclined path until its intersection with the periphery of the rotating drums 40 (FIGS. 3A–3B). The relationship between the travel of the conveyor and the rotation of the composite drum is synchronized by the sprockets 39 such that the edge of the projecting tooth 43 of the sector 42 on each drum 40 engages the trailing side of the lumber board 60a, at the intersection point "X," and accomplishes the transfer of the lumber board from the set of lugs 32a of the conveyor chains 30 to the periphery of the rotating drums 40 (FIG. 3C). The freely-turning rollers 46 serve to provide a near frictionless surface such that the board 60a slides back into the pockets 44 against the set of horizontally-aligned teeth 43 carried by the composite drum, and thus the zenith point is reached (FIG. 3G), whereupon its path of travel then follows a descending arc (FIGS. 3H–3I). At the point "Y" along the descending arc of the wheel's travel, the now properly-aligned board 60a is removed from the composite drum and slides down the out-feed guide 25 (FIG. 3J), whereupon it may be stacked or fed into subsequent apparatus performing further operations thereon.

Referring back to the commencement of the operational sequence (FIG. 3A), the next set of lugs 32b on the conveyor chains 30 is shown as carrying two lumber boards 60b and 60c. As will now be seen, the operation of the machine is such as to cause one of the two boards to be rejected back to the trough 11 at the in-feed 20, thus ensuring that the rate of aligned boards dispensed at the out-feed 25 of the machine is maintained constant. The two juxtaposed boards, with the forward board 60b resting against the following board 60c, are advanced (FIG. 3B) until the intersection point "X" of the conveyor chains 30 with the periphery of the composite drum is reached (FIG. 3C). On account of the spaced relationship maintained between the sectors 42 of each of the drums 40 and the corresponding set of lugs 32b on the conveyor chains 30, the leading edge of the forward board 60b is raised up by the rollers 46 on the flights of the drum sector 42 (FIGS. 3D–3E) until it is elevated near or beyond the vertical (FIG. 3F) and is caused to fall back by gravity to the in-feed 20 of the machine and rejoin the massed pile of lumber contained in the trough 11 (FIGS. 3G–3J). On the other hand, the trailing board 60c, which is advanced directly by the set of horizontally-aligned lugs 32b on the conveyor chains 30, is picked up at "X" by the set of teeth 43 (FIG. 3G) and the transfer of the board from the conveyor to the pockets 44 of the drum is made without incident. Board 60c then follows a path of travel along the circular arc described by the periphery of the composite drum similar to that travelled by board 60a (FIGS. 3H–3J) and is likewise eventually dispensed at the out-feed 25 of the machine oriented in the preferred direction.

The action of the machine in operation is such that all boards which are not carried up the incline of the travelling conveyor by direct engagement with a set of horizontally-aligned lugs are rejected in a selection process performed at the transfer point "X," defined as the intersection point of the conveyor path with the arc of travel of the drum, and are cast back into the jumbled mass of boards contained at the base of the incline. Boards that rest on the top of underlying boards being directly advanced by the chain lugs, as well as those boards whose longitudinal axes do not become aligned in the course of their progressive advance by the conveyor, are similarly rejected at the conveyor-drum transfer point. Thus, all boards appearing at the out-feed of the machine are dispensed individually at a constant rate (no more than one to a set of chain lugs or corresponding drum pockets) and aligned with the same axial orientation in the preferred direction.

It has been found that, for some embodiments of a lumber-handling machine constructed according to the principles of the present invention, the pockets of the composite drum are filled at approximately 90–95% capacity by boards transferred from the conveyor. That is, for the particular embodiment shown in the present drawings, wherein the periphery of the composite drum is divided into five sectors, for every 20 revolutions of the drum, an average of about 92 boards will be individually dispensed at the out-feed of the machine aligned with the same axial orientation. In normal operation the drum is rotated at a speed in the range of 7 to 15 rotations per minute. Therefore, such a lumber-handling machine possesses the capability of sorting, aligning, and dispensing individually up to 70 boards per minute from a scrambled pile of lumber supplied to the in-feed of the machine. In another embodiment of the invention having a composite drum divided into eight sectors and rotated at 12½ r.p.m., approximately 95 boards per minute (corresponding to a capacity of 95%) can be handled by the machine.

FIG. 4 is a schematic diagram illustrating certain geometric relationships existing between components of the embodiment of the invention shown in the preceding figures. As may be seen from the figure, the straight-line portion of the path followed by the upwardly-inclined conveyor 30' makes an angle α with the horizontal or reference datum plane 100. The set of conveyor chain sprockets 39, to which the respective drums 40 are secured and which drive the conveyor 30' and composite drum 40' while maintaining the conveyor lugs 32 in synchronism with the corresponding set of drum sectors 42, are arranged about a circle having a radius $R_1$. The periphery of the composite drum 40', a cylindrical surface defined by the circumferential arc of the set of rollers 46 carried on the outer perimeters of the respective drums 40, has a radius $R_2$, greater than the radius $R_1$ of the sprockets 39. The point of intersection of the path of travel of the conveyor 30' with the circumference of the composite drum 40' has been designated previously as "X." The line 110 in FIG. 4 is drawn between the points "X" and the common center of the two radii $R_1$ and $R_2$.

Specifically, this diagram illustrates the three parameters of the machine's physical construction which affect the location of the interchange point "X," at which the transfer of the lumber boards from the conveyor to the drum takes place, and which determine the effectiveness of the machine in carrying out the selection-rejection process. (This is the process wherein those boards having or assuming axial orientations lying within a small range of deviations from the preferred direction pass through to the output of the machine, and the remainder are rejected back to the in-feed of the machine until each eventually assumes the desired orientation.) These parameters are (1) the angle α which the incline of the conveyor 30' makes with the horizontal 100, (2) the radius $R_1$ of the circle described by the respective sets of sprockets 39 about which the individual chains 30 of the conveyor 30' are driven, and (3) the radius $R_2$ of the circumference of the composite drum cylinder 40'.

In one advantageous embodiment of the present invention the angle α is 45° and the relationship existing between the respective radii of the sprockets 39 and the drum 40' is $$\frac{R_2}{R_1} = \sqrt{2}$$

With such a relationship established among these parameters, the line 110, connecting the interchange point "X" with the common center of the drum and the sprockets, is horizontal (i.e., parallel to the reference datum plane 100). Thus the transfer of the boards from the lugs of the conveyor 30' to the pockets carried on the periphery of the composite drum 40' occurs at a point where the surface of the drum is moving perpendicular to the horizontal (i.e., in a vertical direction). It has been found that the selection-rejection process of the machine is especially enhanced with such a geometrical arrangement of these parameters as those boards which have not become squared up to lie against the set of horizontally-disposed lugs of the conveyor, or which are doubled up on the tops of other boards, almost invariably fall off the surface of the drum at the interchange and are cast back down to the bottom of the conveyor incline. On the other hand, with this particular arrangement, those boards whose longitudinal axes have become aligned in the preferred direction are securely engaged by the teeth and pockets of the sectored composite drum at the interchange point and are carried through to the out-feed of the machine.

In some embodiments of the invention it may be desirable to change these parameters such that the conveyor-drum interchange point "X" is located somewhat below a horizontal line passing through the common center of the radii $R_1$ and $R_2$. This may be readily accomplished by either decreasing the angle α or increasing the ratio $R_2/R_1$. Other good combinations of the respective parameters α, $R_1$, and $R_2$ are possible, and the scope of the present invention is in no wise to be deemed limited to the particular relationships described herein.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. Handling apparatus for individually dispensing elongated articles such as boards in a predetermined orientation comprising, means for dispensing elongated articles having random orientations, first conveyor means having a plurality of spaced supporting means thereon for receiving said randomly oriented articles and carrying same upwardly along a line of travel, second conveyor means traveling a circular path and having a plurality of spaced supporting means thereon for receiving certain of said articles from said first conveyor means, means driving said first conveyor means and said second conveyor means in synchronism whereby the spaced supporting means on said second conveyor means selectively engage and retain only those individual articles which are carried directly by the spaced supporting means of said first conveyor means and have longitudinal axial orientations substantially perpendicular to said line of travel, with the remainder of said articles being rejected back onto said first conveyor means, and means for dispensing said individually selected articles.

2. Lumber handling apparatus for dispensing individual boards in a predetermined orientation comprising, means for feeding in boards having random orientations, first conveyor means receiving said randomly oriented boards and carrying same upwards in a line of travel towards a tangent with a vertically-disposed predetermined circle, said first conveyor means carrying said boards by spaced supporting means thereon lying substantially perpendicular to said line of travel, second conveyor means traveling a circular path concentric with said predetermined circle and having a diameter greater than same, said second conveyor means having spaced board supporting means thereon lying substantially perpendicular to said line of travel, said second conveyor means receiving said boards from said first conveyor means on an ascending arc portion of said circular path, means driving said first conveyor means and said second conveyor means in synchronism whereby said spaced supporting means on said second conveyor means selectively engage and retain only those boards carried by said spaced supporting means on said first conveyor means having axial orientations substantially perpendicular to said line of travel and the remainder of said boards being rejected back onto said first conveyor means, and means for receiving said selected boards from said second conveyor means on a descending arc portion of said circular path.

3. Lumber handling apparatus for dispensing individual boards in a predetermined orientation comprising, a chute for feeding in boards having random orientations, a conveyor receiving said randomly oriented boards and carrying same in a line of travel towards a tangent with an inner diameter of a vertically-disposed wheel containing sprockets disposed around the periphery thereof for meshing with said conveyor, said conveyor carrying said boards by a plurality of spaced lugs disposed thereon with pairs of said lugs being perpendicular to said line of travel, said wheel having a shaft and an outer pitch diameter around the periphery of which is disposed a plurality of projecting tooth pairs and associated rollers lying perpendicular to said line of travel, said wheel receiving said boards from lug pairs on said conveyor on an ascending arc thereof, means driving said wheel on said conveyor by said shaft whereby said tooth pairs on said wheel selectively engage and retain only those boards having axial orientations substantially perpendicular to said line of travel and the remainder of said boards being rejected back onto said conveyor, and a downwardly-inclined slide for receiving said selected boards on a descending arc of said wheel.

4. In combination, a conveyor, means for advancing said conveyor up an inclined path, said conveyor including lugs for engaging and advancing elongated articles, a rotary device rotating on a horizontal axis, said rotary device being positioned near the top of said inclined path and including selector means adapted to select and pick up certain ones of said articles individually from the lugs of said advancing conveyor and to advance them over the top of said rotary device, provided they have a predetermined spacing and orientation transverse to said path, but being adapted to reject articles not having said predetermined orientation and to cause them to fall downwardly along said conveyor means toward the bottom of said inclined path, and means beyond said rotary device for receiving said selected articles advancing over the top of said device and for advancing them along an output path while maintaining them in said predetermined orientation transverse to the path of movement.

5. Apparatus according to claim 4 in which said selector means of said rotary device comprises teeth, and means for synchronizing the motion of said teeth of said rotary device with that of said lugs of said conveyor.

6. Apparatus according to claim 4 in which said selector means of said rotary device comprises pockets for receiving individual articles from individual ones of said lugs, means on said rotary device for advancing said conveyor near the upper end of its path along a first arcuate path, said pockets being positioned on said rotary device to advance around a circular path of larger radius than that of said first arcuate path.

7. Apparatus according to claim 6 in which said rotary device includes projections between said pockets for rejecting unselected articles and causing them to fall downwardly along said conveyor.

References Cited in the file of this patent

UNITED STATES PATENTS

| 2,762,488 | Rendleman | Sept. 11, 1956 |
| 2,946,463 | Smejda | July 26, 1960 |
| 3,080,042 | Sherman | Mar. 5, 1963 |

FOREIGN PATENTS

| 583,748 | Italy | Oct. 17, 1958 |